Nov. 24, 1959

W. J. PARKS 2,914,177

SCREEN

Filed Aug. 25, 1954

INVENTOR.
WALTER J. PARKS
BY
Jay & Jay
ATTORNEYS

Nov. 24, 1959 W. J. PARKS 2,914,177
SCREEN
Filed Aug. 25, 1954 4 Sheets-Sheet 2
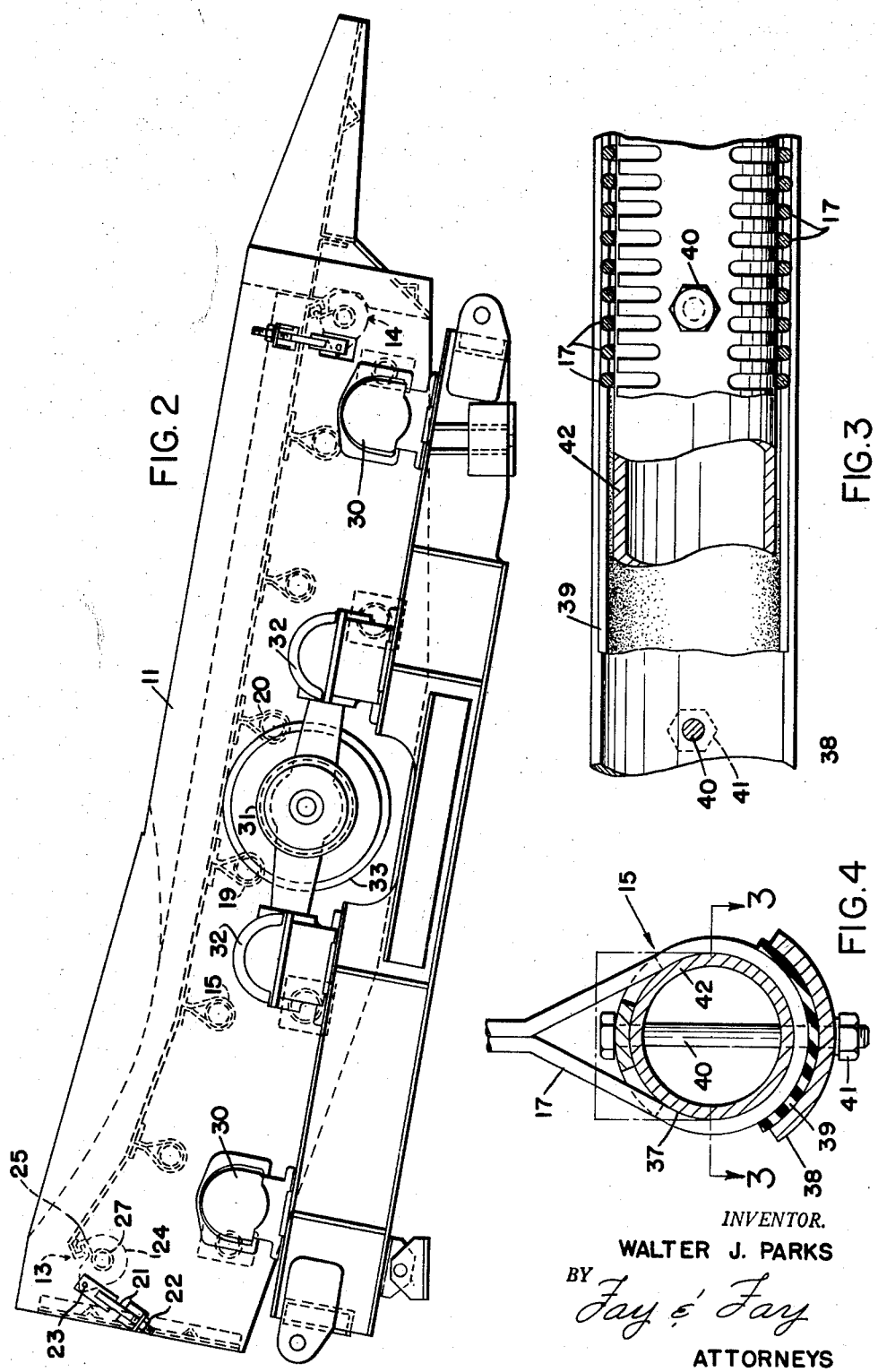
INVENTOR.
WALTER J. PARKS
BY
Jay & Jay
ATTORNEYS Nov. 24, 1959
W. J. PARKS
2,914,177
SCREEN
Filed Aug. 25, 1954
4 Sheets-Sheet 3
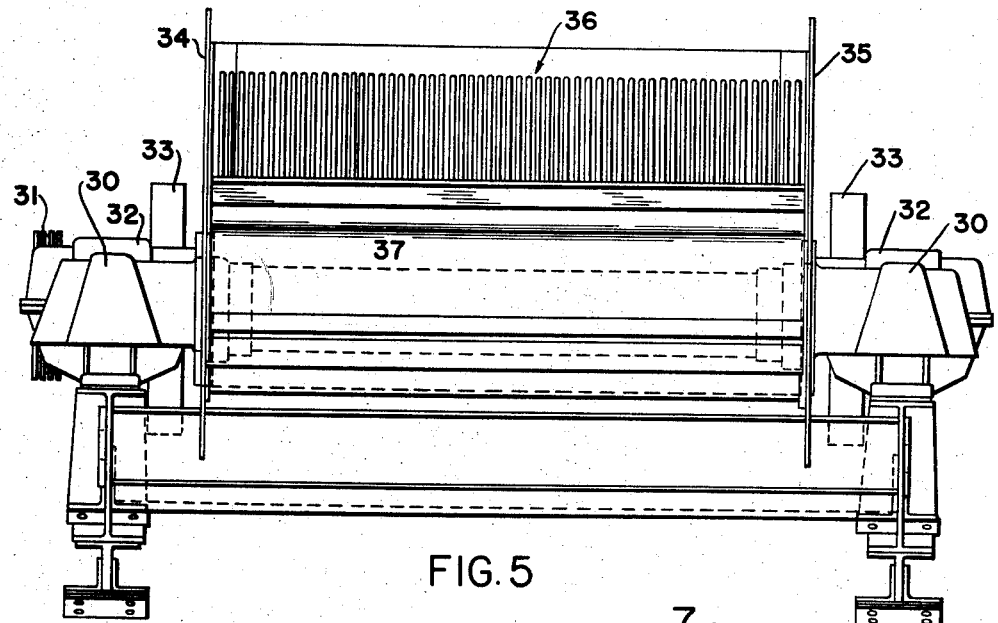
FIG. 5
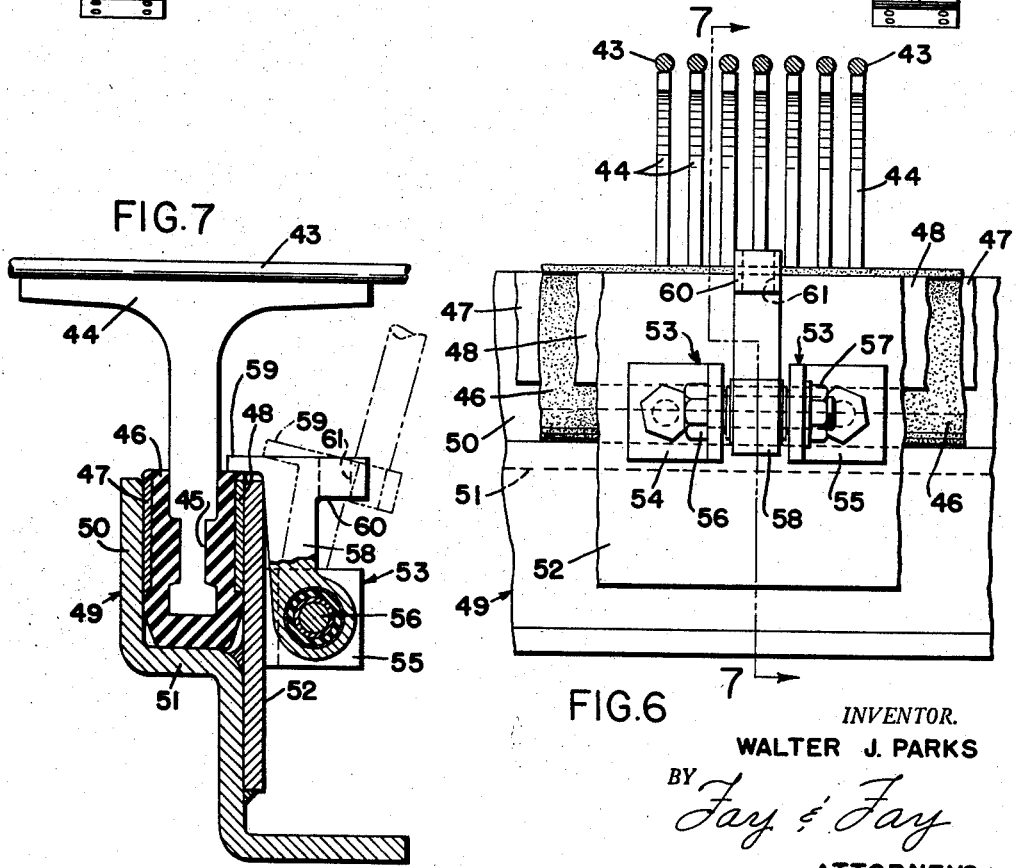
FIG. 7
FIG. 6
INVENTOR.
WALTER J. PARKS
BY *Fay & Fay*
ATTORNEYS

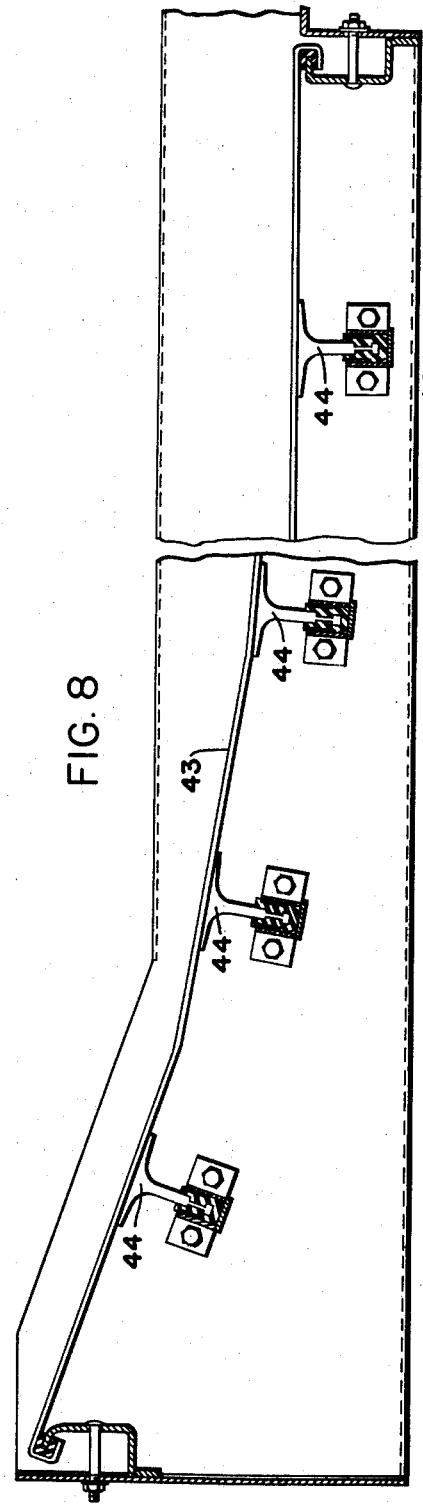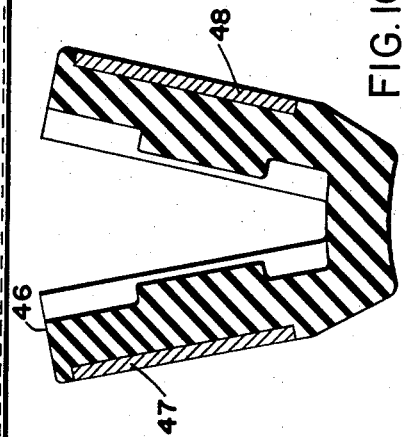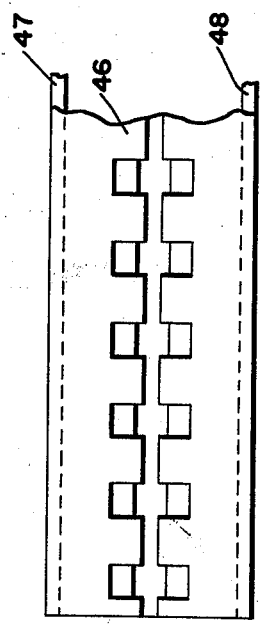

United States Patent Office 2,914,177
Patented Nov. 24, 1959

2,914,177

SCREEN

Walter J. Parks, Cleveland, Ohio, assignor to The W. S. Tyler Company, Cleveland, Ohio, a corporation of Ohio Application August 25, 1954, Serial No. 452,187

4 Claims. (Cl. 209—396)

This invention, relating as indicated to a screen, is more particularly directed to a screen deck structure, particularly a green pellet screen deck structure, adapted to be placed in a vibrating screening apparatus to screen certain types of sticky self-adhering material, particularly green pellets from balling drums and the like of taconite and similar substances. These materials will stick to themselves and almost any object and are, in one example, of a friable mixture of ground taconite ores, bentonite clays, and carbonaceous material, but may include other substances. The uniform mixture is put in a balling drum of quite large diameter for the purpose of agglomerating the material into balls of perhaps ¼" to ¾" in diameter, though the size is not critical and is relative for the apparatus. A considerable portion is either not agglomerated or comes out of the balling drum in pellets of less than the desired diameter.

The particular screen deck structure of this invention comprises a plurality of tensioned rods or bars running longitudinally of the screening apparatus, said screen members having supporting members spaced below the screen forming the deck structure and having no obstructions or cross member in the level of the screening deck or immediately therebelow.

Said pellets are adapted to pass down the screen, which is more or less at an angle, and may be saucer-shaped, to a subsequent apparatus, which in this case might be a sintering bed. In the process it is necessary to screen off the unagglomerated material or pellets which are below size, and are not wanted in the finished product in that condition. However, these particles are very sticky, and difficult to handle continuously, and would stick to any members of the screen deck that are flat and relatively wide and would build with these members as a starting point until a large area of the free screening area is blinded, and obstruct the screening out of the finished and satisfactory particles.

This screening of green pellets has been difficult, and to overcome the problem supporting members are spaced far below the screen bed itself, which is tensioned, and the rods themselves are spaced apart and are supported by means of vertically extending pedestal members, which in one form are T shaped and in another form loop members, which are, in turn, fastened to a supporting structure. In one form of this invention this supporting member is tubular in shape and the loop-like pedestal members are slipped over the outside diameter. The rods then are spaced with a series of fingers on a clamping plate over this supporting member so that each rod is itself spaced at the requisite interval, but there is no member close to the screen itself so that the very sticky material on the deck can build up an obstruction on the screen. At all times, of course, the screen is vibrating and separating unagglomerated particles which will pass through the openings. These particles that are separated are re-used, being put back in the balling drum for subsequent treatment. It is important that the agglomerated balls be not broken or damaged as the efficiency of the operation may be impaired by the redistribution of moisture or disintegration of the balls.

This invention particularly relates to the combination of the screen deck structure particularly adapted as it is to fit in a vibrating screening apparatus for screening green pellets and similar materials. This invention also relates to a method of screening sticky or self-adhering substances into a fairly uniform size for subsequent treatment, such as sintering.

An object of this invention is to produce a screen deck structure for a vibrating apparatus adapted for sticky material.

A further object of this invention is to produce a screen deck structure for a vibrating apparatus having supporting members spaced far below the level of the screening surface for retaining the screening members at spaced intervals relative to one another.

A further object of this invention is to produce a method of screening a sticky substance to produce a fairly uniform particle size and to prevent the screen from blinding or clogging in operation.

To the accomplishment of the foregoing and related ends, said invention, then, consists of the screening device and means hereinafter fully described and particularly pointed out in the claims, the following description setting forth in detail one approved method of screening, such disclosed method, however, constituting but one of the various ways in which the principles of this invention to a green pellet screen deck structure may be used.

In the drawings:

Figs. 1–a and 1–b are a cross-sectional view longitudinally of the apparatus showing the support means therefor, Fig. 2 is a reduced side view of the apparatus showing the vibrating mechanism in position, Fig. 3 is a cut-away view along the lines 3—3 of Fig. 4 through the support means for the longitudinal rods, Fig. 4 is a cross-sectional view through the support means and tubes, Fig. 5 is an end view looking up the apparatus of the longitudinal rods and showing the vibrating means on the side thereof, Fig. 6 is a fragmentary side view of an alternate modification of the pedestal supports, Fig. 7 is a cross-sectional view along the lines 7—7 of Fig. 6, Fig. 8 is a side view of the screen deck structure of this alternate modification, Fig. 9 is a top elevation view of the rubber support block, and Fig. 10 is a sectional view of the rubber support block in the open position.

In the drawings, Figs. 1–a and 1–b, 10 shows the apparatus proper, consisting of side plates 11 and a screen deck 12, end fastening means shown generally at 13 and at the discharge end at 14, support hangers or strut shown generally at 15, which are secured to the rods 12, as for example, at 16 by a loop hanger 17. Much of the other details of the apparatus, including the discharge gate, are conventional in these structures and will not be described in detail. However, for clarity, 18 shows the position through which the vibrating apparatus is fastened to the side plates. Other support means and tubes for the screen plate are shown at 19 and 20. The deck proper is curved at the top end and this is particularly so in connection with this apparatus, as it is adapted particularly for use with a balling drum of quite large size to reduce the amount of drop from the balling drum to the vibrating screening apparatus, and also increase the screening angle at this point of maximum material density on the screen surface. The rods themselves are not spaced apart by any means in the plane of the vibrating screening surface (between the end tensioning members 13 and 14). They are spaced apart by a spacer on the cross supports or tubes. At the ends they are tensioned and, for example, the upper tensioning means consists of a threaded unit 21 having a nut for tensioning at 22 and a pin or connecting means 23 to a circular plate having an ear thereon which is welded to a transverse tubular supporting member 27, said plate being shown at 24. Secured to another portion of the plate at 25 is an L-shaped bar member. Surrounding part of said bar is rubber at 26 and the rods which are preformed around said rubber, said rods being shown at 28. Intermediate and at the opposite ends of said tubular member 27 are other plates similar to plate 24 for securing said tensioning bar 25.

The lower tensioning means is substantially the same, having take-up means and a preformed rod around a rubber fastening means. Details of this will not be repeated. At the lower end of the apparatus is a gate shown generally at 29 but will not be described herein.

Referring briefly to Fig. 5, this shows an end view looking at the apparatus and there are resilient supporting blocks shown at 30, a belt pulley shown at 31, which may be connected to a source of power such as an electric motor. The vibrating apparatus and its housing at the end is shown at 32, and large counter-weighted wheels for the vibrating apparatus are shown at 33. The side plates for the apparatus are shown on the left at 34 and the right at 35 and the individual rods at 36. Support means for the apparatus, consisting of I and H beams, are not described and are believed to be conventional in connection with the apparatus. Drive means for the apparatus pass through the center as shown at 37 in a large tube. All of these, however, are well below the level of the screening deck.

Each of the support means for the longitudinal rods or wires is well below the level of the screening deck, taking for example the tube and support means shown generally at 15, which is enlarged in the view of Fig. 4. For further detail, Fig. 3 is a cross-sectional view of the support means along the line 3—3 of Fig. 4. Said loop means is shown at 17 and it is fastened to the rod as is shown at 16, as perhaps by welding on either side of the loop. The loop surrounds the tube at 37 and in this assembly there is a bottom plate shown at 38, a rubber pad member shown at 39, and on the top there is a top plate with a multiplicity of spaces along the edges for spacing the loops 17 at the correct interval relative to one another. For example, in one particular screening apparatus the rods would be 75 in number, perhaps at ⅜" or ¼" spacing, and would be capable of separating balls of the same size from the screen feed. Completely through the top plate and the bottom plate in the support means would be a bolt shown at 40, having a nut or other type fastening means at 41. This assembly would be pre-assembled in this instance and the complete set of rods would be assembled into the vibrating screening apparatus and the tubes 39 would be fastened at their ends to the side plates previously described, and the tensioning means would take up the tension in the rods. This complete assembly with the bottom plate would then hold the loop members and the rods in a fixed relationship to one another, and the support means for the rods intermediate the tensioning means at the ends would be below the level of the screen deck. Said screen deck, as is shown in Fig. 2, is slightly arcuate at the upper end, but in some instances it may be desirable to have it straight rather than arcuate.

As an alternate means for securing the rods to the support means I have shown Figs. 6, 7, 8, 9 and 10. In these views 43 would be an upper rod of the screen deck and 44 would be the T-shaped pedestal support or strut. The said T-shaped pedestal support member has a reduced portion at the lower end of the T at 45, said reduced portion fitting into a rubber support means 46, having said plates 47 and 48, and fitted generally into a U-shaped frame shown at 49, said frame comprising a vertical member 50, a lower horizontal member 51 joined thereto, and a right vertical side member 52, secured perhaps as by welding.

Between the individual T-shaped support members for the rods, the rubber would support the T-shaped members laterally to provide proper lateral spacing between the rods. To hold said configuration within the U-shaped frame there would be a pair of brackets shown generally at 53, comprising a left bracket 54 and a right bracket 55, having mounted therebetween, as by means of bolts shown at 56 and nut fastening means as at 57, a pivotally mounted member 58, having a projection or overhanging flange at 59, and another flange shown at 60, having an aperture therein 61. Said latter aperture being for a bar or other means to pivotally move said holding member into an outer position, said bar would then pass through the screen to contact said pivotal member. The exact nature of the support means around the pivotal connection is not more fully described but could well be in the nature of a rubber bonded means to hold the pivotal member resiliently between the ears.

In this construction the U-shaped supporting block and the rubber blocks surrounding the T-shaped pedestals may be held in position against the tension on the rods, which would be inclined to pull the rubber support members out of their mounting. At the same time they may take both a vertical stress as applied by the loading members and be capable of withstanding the tension, but are resiliently mounted therein.

The arguments as to the spacing below the level of the screen deck apply equally in connection with this modification.

Fig. 8 is a fragmentary cut-away view of the screen deck showing this particular modification with end support means of somewhat lighter construction for tensioning the screen deck. The rods are shown at 43 and one or more of the T-shaped pedestals at 44, and the remaining construction as earlier indicated, some parts being eliminated for simplicity of disclosure.

Fig. 9 shows a top view of the rubber mounting block showing particularly the spacing between the openings for the pedestal support.

Fig. 10 is a view of the block distended in order to permit the entrance of the pedestal members.

Figure 1A:
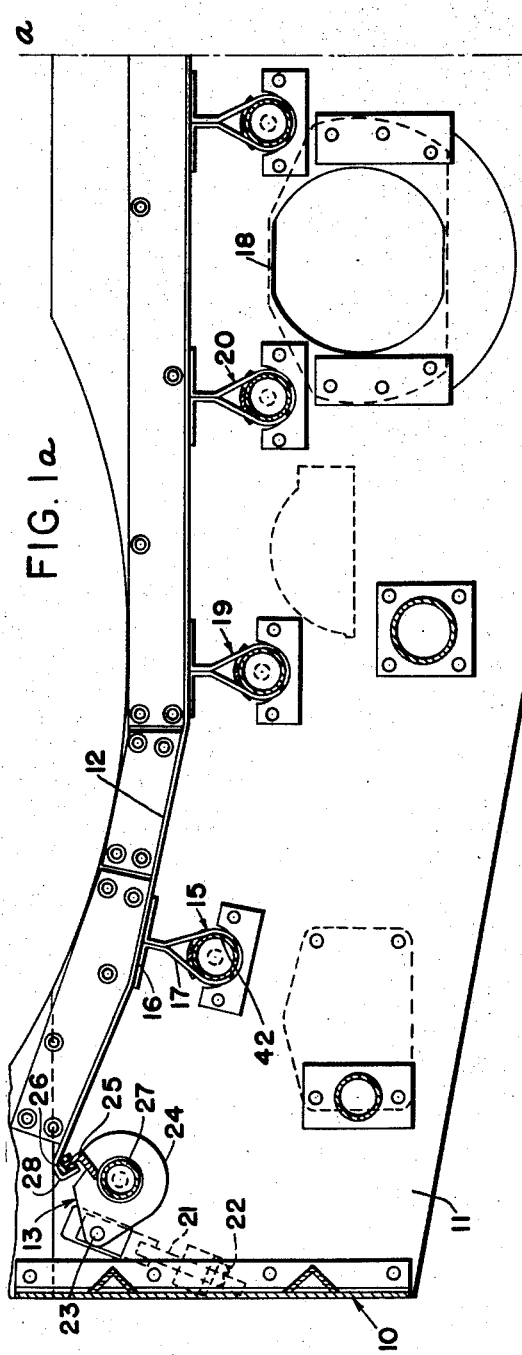
Figure 1B:
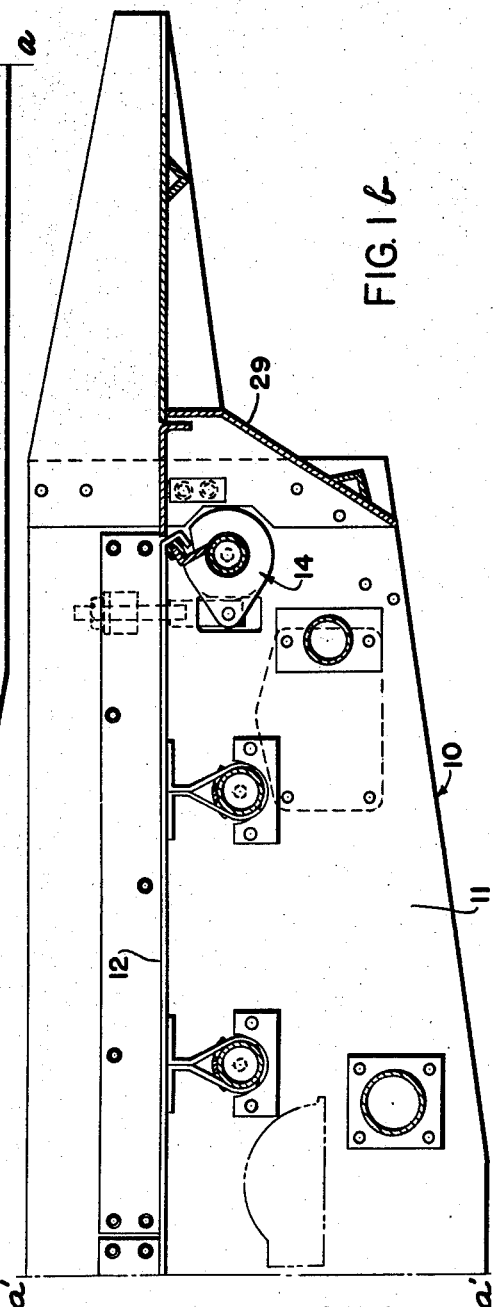

Said construction, then, would provide for a resilient support of the screen deck and at the same time there would be a certain amount of play, both upwardly and downwardly, the hinged pin bearing taking a part of this load when tension is exerted on the screen deck and rods.

It will be appreciated, of course, that there is no contact between the rods in the plane of the screen deck except in the resilient rubber support means.

Other types of construction are possible and come within the disclosures of this application. In general, however, the vertical members or loops, or their equivalents, are placed in tension by the tension on the rods. This construction is simple and produces the object with the simplest construction, and by the inherent nature of the invention, permits a thin rod to aid in the separation of the material with a fixed spacing between the rods without having excessive weight or strength in the elements themselves. The combination of the tension on the rods together with the pedestal supports provides this combination of elements to accomplish the screening desired without the cross members being anywhere near the plane of the screen. The construction then produces a continuous smooth deck with no cross members at the level of the screening deck to collect the sticky materials, preventing the materials from building or caking up and impeding the easy, uninterrupted passage of the finished oversized pellets or their material over the screen.

It will also be seen, of course, that this is an improved process for screening sticky material from a balling drum in particular. The material is handled very gently but at the same time the necessary vibratory action is imparted to the product so that unagglomerated particles will sift and pass through a vibrating screening apparatus. The material is also handled so that the material does not drop and the agglomerated particles separate and stick to any surface they may fall on.

Although the present invention has been described in connection with a preferred vibrating screening apparatus and a preferred screen deck structure, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. In a screen bed for green pellets adapted for placement on a vibrating screening apparatus, a multiplicity of flexible elongated elements, means for supporting the flexible elongated elements in generally parallel spaced screening relation, means for longitudinally tensioning the flexible elongated elements, strut members secured to and depending from the underside of said flexible elongated elements, said strut members being generally aligned transversely of the screen bed, strut engaging means mounted beneath and transversely of the screen bed in fixed relation to the support means therefor, means for connecting the strut members to the strut engaging means in spaced relation transversely of the screen bed, said strut members lying within the projected outlines of the flexible elongated elements so that green pellets can pass through screen and will not attach thereto, said strut engaging means being spaced considerably below the plane of the screen bed to prevent a buildup of sticky green pellets on the screen bed which will obstruct the flow of particles through the screen bed.

2. In a vibrating screening apparatus for green pellets comprising a screen bed of a multiplicity of flexible elongated screening elements, frame means for supporting said flexible elongated screening elements in generally parallel spaced screening relation, means at the opposite ends of said frame means for longitudinally tensioning the flexible elongated screening elements, loop members attached to and depending from the underside of said flexible elongated screening elements and spaced at intervals along said elements, the loops of adjacent screen elements being arranged in groups with the loops of each group aligned transversely of the screen bed, said loops lying within the projected outlines of the elongated flexible screening elements, a transverse support member engaging the aligned loops of each group and secured in generally fixed relation to the frame means, spacing means on said transverse support member for maintaining the loops at spaced intervals transversely of the screen bed whereby a screen bed having no cross members is produced which will prevent the buildup of sticky particles on the screen bed.

3. The structure defined in claim 1 wherein the strut members include open loops adjacent to their lower extremities, said loops being aligned transversely of the screen bed, and wherein the strut engaging means is in the form of an elongated member passed through the aligned loops.

4. The structure defined in claim 1 wherein the strut members are each provided with a shouldered formation adjacent the lower extremity thereof, said shouldered formations being aligned transversely of the screen bed, and wherein said strut engaging means includes a socket formation for interlockingly engaging the respective shouldered formations on the strut members.

References Cited in the file of this patent

UNITED STATES PATENTS

| | | |
|---|---|---|
| 112,911 | Fair | Mar. 21, 1871 |
| 985,558 | Thayer | Feb. 28, 1911 |
| 1,308,998 | Stone | July 8, 1919 |
| 1,315,693 | Wiseman | Sept. 9, 1919 |
| 1,458,299 | Jacquelin | June 12, 1923 |
| 2,010,256 | Cole | Aug. 6, 1935 |